(12) United States Patent
Liang et al.

(10) Patent No.: US 10,752,748 B2
(45) Date of Patent: *Aug. 25, 2020

(54) METHODS FOR RECYCLING REINFORCED COMPOSITES (71) Applicant: ADESSO ADVANCED MATERIALS WUHU CO., LTD., Wuhu (CN)

(72) Inventors: Bo Liang, Plainsboro, NJ (US); Bing Qin, Shanghai (CN); Stefan Pastine, San Francisco, CA (US); Xin Li, Cambridge (GB)

(73) Assignee: ADESSO ADVANCED MATERIALS WUHU CO., LTD., Wuhu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,279

(22) Filed: Feb. 3, 2017

(65) Prior Publication Data
US 2017/0145180 A1 May 25, 2017
US 2020/0239659 A9 Jul. 30, 2020

Related U.S. Application Data

(62) Division of application No. 14/114,140, filed as application No. PCT/CN2012/075084 on May 4, 2012, now Pat. No. 9,598,551.

(30) Foreign Application Priority Data

Jul. 8, 2011 (WO) ............... PCT/CN2011/076980

(51) Int. Cl.
*C08J 11/16* (2006.01)
*C08J 11/26* (2006.01)

(52) U.S. Cl.
CPC ............... *C08J 11/16* (2013.01); *C08J 11/26* (2013.01); *C08J 2363/00* (2013.01); *Y02W 30/705* (2015.05); *Y02W 30/706* (2015.05)

(58) Field of Classification Search
CPC .......... C08J 11/16; C08J 11/26; C08J 2363/00
See application file for complete search history.

(56) References Cited

U.S. PATENT DOCUMENTS 2,409,675 A   10/1946  Gresham
4,177,173 A   12/1979  Carr
(Continued)

FOREIGN PATENT DOCUMENTS

CN        101775194 A      7/2010
WO    WO 2012/071896    *  6/2012

OTHER PUBLICATIONS

Paramonov et al, "Fully Acid-Degradable Biocompatible Polyacetal Microparticles for Drug Delivery", Bioconjugate Chemistry (2008), 19, pp. 911-919 (Year: 2008).*

*Primary Examiner* — Frances Tischler
(74) *Attorney, Agent, or Firm* — JCIPRNET

(57) ABSTRACT

The present invention relates to methods for recycling reinforced composites. The reinforced composite comprises a reinforcement material in a cross-linked polymer matrix, wherein the cross-linked polymer comprises a cross-linking group derived from a curing agent represented by formula I, wherein $R^1$ is hydrogen, alkyl, cylcoalkyl, heterocycloalkyl, alkenyl, cycloalkenyl, aryl, heteroaryl, alkoxy alkyl or alkynyl; A is alkyl, alkenyl, alkenene, alkylene-hetero-alkylene, alkylene-heterocyclo-alkylene, alkylene, alkylene-oxy-alkylene, 1,4-alkyl substituted piperazine, carbonyl, thiocarbonyl; B is alkyl, alkenyl, alkenene, alkylene-hetero-alkylene, alkylene-heterocyclo-alkylene, alkylene, alkylene-oxy-alkylene, 1,4-alkyl substituted piperazine, carbonyl, thiocarbonyl; $R^2$ is hydrogen, alkyl, aminoalkyl, alkyl-amino-alkyl, (Continued)

cylcoalkyl, heterocycloalkyl, alkenyl, aryl, or heteroaryl; and $R^3$ is hydrogen, alkyl, aminoalkyl, alkyl-amino-alkyl, cylcoalkyl, heterocycloalkyl, alkenyl, aryl, or heteroaryl.

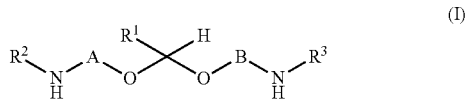

(I)

16 Claims, 2 Drawing Sheets

(56) References Cited

U.S. PATENT DOCUMENTS

| | | | |
|---|---|---|---|
| 5,783,272 A | | 7/1998 | Wong |
| 5,932,682 A | * | 8/1999 | Buchwalter ............ C08G 59/22 |
| | | | 525/504 |
| 6,962,628 B1 | * | 11/2005 | Shibata .................... C08J 11/10 |
| | | | 134/10 |
| 9,631,049 B2 | * | 4/2017 | Pastine ................ C07D 295/13 |
| 2005/0234216 A1 | | 10/2005 | Klein et al. |
| 2008/0081170 A1 | | 4/2008 | Tilbrook et al. |
| 2011/0152448 A1 | | 6/2011 | Corley et al. |

\* cited by examiner

METHODS FOR RECYCLING REINFORCED COMPOSITES

CROSS-REFERENCE TO RELATED APPLICATIONS

This application is a divisional application of U.S. application Ser. No. 14/114,140, filed on Mar. 21, 2014, which in a U.S. national phase application of PCT/CN2012/07085, filed on May 4, 2012, which in turn claims priority PCT/CN2011/076980, filed on Jul. 8, 2011, the contents of which are incorporated herein by reference in their entireties.

TECHNOLOGY FIELD OF THE INVENTION

The invention belongs to the field of composite materials and epoxy compositions. More specifically the present invention belongs in the field of recyclable composite materials and in the field of reworkable/degradable epoxies.

BACKGROUND OF THE INVENTION

Epoxies serve massive global markets in adhesives and coatings, and are also one of the industry standard thermosetting plastic matrices used for construction of fiber reinforced plastics (FRP). FRPs are composite materials consisting of a polymer matrix and a fiber such as carbon fiber, fiberglass, aramid fiber, natural fiber, or other fiber. The fiber serves to enhance the properties of the plastic in areas such as strength and elasticity. FRPs are also commonly referred to as "plastic composites" or, for simplicity, just "composites." The term "plastic composites" can also embody plastic materials that have non-fibrous entities incorporated in them such as metals or nanomaterials. Plastic composites provide lightweight alternatives to other structural materials (e.g., steel or aluminum) and are widely used in the automotive, aerospace, nautical craft, wind energy, and sporting goods sectors. The incorporation of lightweight composites can offer substantial environmental benefits by way of leading to increased energy efficiency; yet, the positive impact of thermosetting plastic composites is offset by their lack of recyclability and persistence in the environment. The predicted waste accumulation in the growing wind power industry is an illustrative example. The current output of wind energy is approximately 10 times that of the production in 1980, and windmill blade propellers can reach over 60 meters in length. The material wastage from wind motor blade is estimated to reach 225,000 tons per year by 2034. The weight percentage of epoxy in fiber reinforced epoxies typically is in the range of 25-40%. The raw materials (i.e. the plastic and fiber) that go into composite construction can be expensive, and are usually of petrochemical origins. Thus, there are both economic and environmental drivers for the development of new recyclable fiber reinforced epoxy plastics.

The most common epoxy formulations consist of a diepoxide ("resin") and a polyamine ("hardener") to form a cross-linked polymeric network of essentially infinite molecular weight (the combination of "resin+hardener" is sometimes referred to as "cured epoxy" or "cured resin" or simply "resin" or epoxy). The widespread utility of such epoxy formulations for composite manufacturing is due to excellent processablity prior to curing and their excellent post-cure adhesion, mechanical strength, thermal profile, electronic properties, chemical resistance, etc. Further, the high-density, three-dimensional network of epoxies make them extremely robust materials, tolerant of a wide range of environmental conditions. At the same time, the cross-linked network makes their removal, recycling and reworkability notoriously difficult. The cross-linking reactions that occur with conventionally used polyamine epoxies formulation are essentially irreversible; therefore, the material cannot be re-melted and re-shaped without decomposition; the material cannot be readily dissolved either. As a result, finber reinforced epoxies or epoxy-based composite materials are not amenable to standard recycling practices because the epoxy matrix and fibers cannot be readily separated, and recovered.

Current disposal methods of composites typically involve land filling, grinding and burning. Burning provides a mechanism to recover some of the energy input, but the incineration process requires large amounts of energy and remains questionable from an environmental standpoint. An emerging technology for recycling of carbon fiber composites involves special incinerators that are capable of burning away the plastic matrix of the composite and leaving behind the carbon fiber, which then can be reclaimed. While this approach is a step forward with regard to sustainability, it does not represent a more fully recyclable approach as the plastic matrix is not recovered in a repurposable form as it is destroyed in the process.

There are no known examples in the prior art of use of composite materials constructed from reworkable epoxy compositions. The use of reworkable and/or degradable epoxy resin composition for the fabrication of composite materials is unknown in the art. Further, the recycling of degradable epoxy composites, whereby the constitution of the epoxy and the reinforcement material are recovered with high efficiency.

BRIEF SUMMARY OF THE INVENTION

The present invention relates to a reinforced composite comprising a reinforcement material in a cross-linked polymer matrix (preferably a cross-linked epoxy resin matrix), wherein the cross-linked polymer comprises a cross-linking group derived from a curing agent represented by formula I:

(I)

wherein R1 is hydrogen, alkyl, cylcoalkyl, heterocloalkyl, alkenyl, cycloalkenyl, aryl, heteroaryl, alkoxy alkyl or alkynyl; A is alkyl, alkenyl, alkenene, alkylene-hetero-alkylene, alkylene-heterocyclo-alkylene, alkylene, alkylene-oxy-alkylene, 1,4-alkyl substituted piperazine, carbonyl, thiocarbonyl; B is alkyl, alkenyl, alkenene, alkylene-hetero-alkylene, alkylene-heterocyclo-alkylene, alkylene, alkylene-oxy-alkylene, 1,4-alkyl substituted piperazine, carbonyl, thiocarbonyl; R2 is hydrogen, alkyl, aminoalkyl, alkyl-amino-alkyl, cylcoalkyl, heterocycloalkyl, alkenyl, aryl, or heteroaryl; and R3 is hydrogen, alkyl, aminoalkyl, alkyl-amino-alkyl, cylcoalkyl, heterocycloalkyl, alkenyl, aryl, or heteroaryl.

In the reinforced composite of the present invention, the cross-linked epoxy resin matrix is derived from a degradable curing agent, an epoxy resin and an optional auxiliary material, said curing agent is represented by the following formula I:

wherein $R^1$ is hydrogen, alkyl, cylcoalkyl, heterocycloalkyl, alkenyl, cycloalkenyl, aryl, heteroaryl, alkoxy alkyl or alkynyl; A is alkyl, alkenyl, alkenene, alkylene-hetero-alkylene, alkylene-heterocyclo-alkylene, alkylene, alkylene-oxy-alkylene, 1,4-alkyl substituted piperazine, carbonyl, thiocarbonyl; B is alkyl, alkenyl, alkenene, alkylene-hetero-alkylene, alkylene-heterocyclo-alkylene, alkylene, alkylene-oxy-alkylene, 1,4-alkyl substituted piperazine, carbonyl, thiocarbonyl; $R^2$ is hydrogen, alkyl, aminoalkyl, alkyl-amino-alkyl, cylcoalkyl, heterocycloalkyl, alkenyl, aryl, or heteroaryl; and $R^3$ is hydrogen, alkyl, aminoalkyl, alkyl-amino-alkyl, cylcoalkyl, heterocycloalkyl, alkenyl, aryl, or heteroaryl.

The present invention further relates to a method for recycling the reinforced composite, comprising a step of degrading the cross-linked polymer matrix using an acid and a solvent, preferably under a heating condition (e.g., heating at a temperature of 15-400° C., preferably 80-120° C., for 1-24 hours, preferably 4-8 hours).

The acid used in the present invention is at least one selected from a group consisting of hydrochloric acid, acetic acid, lactic acid, formic acid, propionic acid, citric acid, methane sulfonic acid, p-toluene sulfonic acid, nitric acid, sulfuric acid, benzoic acid, and phthalic acid, at a concentration range of 2-90% by weight, preferably 10-20% by weight.

The solvent used in the present invention is at least one selected from a group consisting of methanol, ethanol, ethylene glycol, isopropyl alcohol, butyl alcohol, pentanol, hexanol, heptanol, octanol alcohol, nonyl alcohol, and water.

It is preferable that the method for recycling the reinforced composite of the present invention further comprises a step of recovering the degradation product via a filtration process and/or a precipitation process.

According to the present invention, a fully recyclable fiber reinforced composite can be obtain, as a cross-linked epoxy resin matrix derived from a degradable curing agent and an epoxy resin is used. Moreover, the recycling method of the fiber reinforced composite can be performed under relatively mild reaction conditions, economically, and easy to control.

DETAILED DESCRIPTION OF THE INVENTION

The present invention relates to the fabrication of recyclable fiber reinforced epoxy resin composites. More specifically, the present invention relates to the use of epoxy resin compositions derived from diepoxide resins with reworkable amine hardeners for the fabrication, construction, and/or manufacturing of recyclable fiber reinforced epoxy composites. Such recyclable thermosetting composite materials can be fabricated using standard composite manufacturing techniques such as wet lay-up, filament winding, vacuum infusion, compression molding, etc. These materials have excellent mechanical properties that make them useful for different composite applications. These composites materials can also be degraded under specific conditions, leading to the separation and recovery of both the reinforcing fiber and the epoxy resin constitution in the form of an epoxy polymeric material. These composite materials can be recycled precisely because the epoxy matrix of a fabricated composite is derived from reworkable epoxy compositions. Thus, the present invention enables the manufacture of recyclable epoxy composites as both the epoxy, and the components in contact with the epoxy, can be readily separated and recovered using a solution-based recycling process.

The present invention employs diepoxide resins that are hardened with degradable curing agents, which are combined with the fibers to prepare fiber reinforced epoxy resin composites. The fabricated epoxy composites are recycled in the mixture of heat, acid and solvent, which result in the dissolution of the epoxy matrix. The epoxy is capable dissolution under these conditions because the cross-links in the epoxy matrix are acid-labile and undergo a bond cleavage reaction. As a result, the cross-linked epoxy is transformed into individual epoxy polymers (i.e., an epoxy thermoplastic), which are soluble in organic solvents. Once the epoxy matrix has sufficiently dissolved into solution, the fibers can be removed from the solution. The polymeric decomposition products of the epoxy resin can be recovered from the recycling solution via neutralization with alkali, precipitation, solid-liquid separation to yield epoxy polymer material.

In particular, the present invention relates to the use of reworkable epoxy compositions for the fabrication of recyclable fiber reinforced epoxy composite, and the recycling of said composites, which includes the following 3 steps:

Step 1: The Preparation of Reworkable Epoxy Compositions Derived From Epoxy Resins and Degradable Curing Agents.

Preferred degradable curing agents are those that contain acid liable groups that enable the curative to decompose under acidic conditions. Most preferred are polyamine-based degradable hardeners such as aminoacetal, aminoformals hardeners described in United States Patent Application No. PCT/CN2011/076980. The preferred series of degradable curing agents can be used in combination with a variety of diepoxide resin well know in the art. The preferred series of degradable curing agents can be formulated with common additives such as viscosity modifiers, diluents, thixotropic agents, fillers, UV-stabilizers, pigments, adducts to decrease cure time, optical brighteners, adhesion promoters, accelerators, and other common additives well known in the art to customize the processing properties and/or the final properties of the reworkable epoxy composition.

The preferred series of degradable curing agents are represented by the following formula I:

wherein R1 is hydrogen, alkyl, cylcoalkyl, heterocycloalkyl, alkenyl, cycloalkenyl, aryl, heteroaryl, alkoxyalkyl or alkynyl; A is alkyl, alkenyl, alkenene, alkylene-heteroalkylene, alkylene-heterocyclo-alkylene, alkylene, alkylene-oxy-alkylene, 1,4-alkyl substituted piperazine, carbonyl, thiocarbonyl; B is alkyl, alkenyl, alkenene, alkylene-heteroalkylene, alkylene-heterocyclo-alkylene, alkylene, alkylene-oxy-alkylene, 1,4-alkyl substituted piperazine, carbonyl, thiocarbonyl; R2 is hydrogen, alkyl, aminoalkyl, alkyl-amino-alkyl, cylcoalkyl, heterocycloalkyl, alkenyl, aryl, or heteroaryl; and R3 is hydrogen, alkyl, aminoalkyl, alkyl-amino-alkyl, cylcoalkyl, heterocycloalkyl, alkenyl, aryl, or heteroaryl.

In formula I, R1 is preferably hydrogen, C1-12 alkyl, C3-12 cylcoalkyl, C6-12 aryl or C3-11 heteroaryl, more preferably hydrogen, C1-6 alkyl, C4-6 cylcoalkyl, C6-10 aryl or C3-8 heteroaryl, and most preferably hydrogen, methyl, ethyl, propyl, 2-propyl, butyl, 2-butyl, or t-butyl.

In formula I, A is preferably C1-8 alkylene, C2-12 alkylene-hetero-alkylene, C4-16 alkylene-heterocyclo-alkylene, carbonyl or thiocarbony, more preferably C1-8 alkylene, C2-8 alkylene-hetero-alkylene, or C4-10 alkylene-heterocyclo-alkylene, and most preferably ethylene, propylene.

In formula I, B is preferably C1-8 alkylene, C2-12 alkylene-hetero-alkylene, C4-16 alkylene-heterocyclo-alkylene, carbonyl or thiocarbony, more preferably C1-8 alkylene, C2-8 alkylene-hetero-alkylene, or C4-10 alkylene-heterocyclo-alkylene, and most preferably ethylene, propylene.

In formula I, R2 is preferably hydrogen, C1-8 alkyl, cylcoalkyl, heterocycle, aryl, or heteroaryl, each 4 to 10 membered heterocycloalkyl contains at least one ring nitrogen atom and is optionally substituted at a ring carbon atom with at least one amino group, and most preferably hydrogen, methyl, or ethyl.

In formula I, R3 is preferably hydrogen, C1-8 alkyl, cylcoalkyl, heterocycle, aryl, or heteroaryl, each 4 to 10 membered heterocycloalkyl contains at least one ring nitrogen atom and is optionally substituted at a ring carbon atom with at least one amino group, and most preferably hydrogen, methyl, or ethyl.

Preferably, the degradable curing agents of the present invention are selected from the group consisting of:

Step 2: The Use of Reworkable Epoxy Resin Compositions for the Preparation of Degradable Fiber Reinforced Composites The reworkable epoxy compositions in step 1 are combined with glass fibers, carbon fibers, natural fibers, synthetic fibers, or other fibrous materials in order to prepare reinforced epoxy composites. The reworkable epoxy compositions in step 1 can also be combined with non-fibrous reinforcement materials such as nanoparticles, born nitride, carbon nanotubes, carbon black, and other non-fiberous materials in order to prepare composite materials. The reworkable epoxy compositions have suitable characteristic that make them amenable for use in standard thermosetting composite manufacturing techniques such as wet lay-up, filament winding, vacuum infusion, compression molding, resin transfer molding.

Step 3: The Recycling of A Fiber Reinforced Degradable Epoxy Resin Composite

The composites fabricated according to step 2 are recycled and materials recovered by 1) subjecting the composite material to a recycling solution of acid and solvent; 2) subsequent dissolution of the epoxy matrix; 3) removal and recovery of the fibrous materials; 4) recovery of the cleaved epoxy matrix via neutralization with alkali and precipitation by the addition of a non-solvent.

The epoxy is capable dissolving under these conditions because the cross-links in the epoxy matrix are acid-labile and undergo a bond cleavage reaction at the acetal, formal moiety of the crosslinking tether. As a result, the cross-linked epoxy is transformed into individual epoxy polymers (i.e., an epoxy thermoplastic), which are soluble in organic solvents. Both the recovered fibers and the recovered epoxy polymer can be separated, recovered, and may be re-used or re-purposed for other applications. The recycling solution may contain inorganic or organic acid. Specific but non-limiting examples of acid suitable for degradation of the epoxy matrix include independently, or in combination, hydrochloric acid, acetic acid, methanesulfonic acid, p-toluene sulfonic acid, nitric acid, sulfuric acid or other acids. The recycling solvent can be almost any common solvent, but is most preferably a solvent that is protic in natures. Specific but non-limiting examples include, independently, or in combination, water, methanol, ethanol, ethylene glycol, isopropyl alcohol, butyl alcohol, pentanol, hexanol, heptanol, octanol or other common alcohols.

Existing thermosetting composite recycling technology entails the incineration of the plastic constitution of the material and recovery the reinforcement fiber. The use of reworkable epoxy compositions to fabricate composites, as detailed in the present invention, ultimately allows a more fully recyclable approach because it enables both plastic and fibers to be recovered from the composite. The details are as follows:

1. The degradation rate of reinforced degradable epoxy composites under the recycling conditions can be tuned by the molecular structure of the degradable curing agent. For example, an epoxy resin composition derived from amino ketal curing agent will degrade more quickly in an acidic solution than from one derived from an aminoformal curing agent.

2. The cross-linked epoxy resin degrades into epoxy-based polymers, which can be classified as epoxy thermoplastics. The mass recovery of this plastic material is high and atom economical as only the acetal, formal moiety is expelled from the original cross-linked material. Epoxy thermoplastics are engineered polymers that can be used in other industrial applications.

3. The combined mass recovery of the reinforcement materials and epoxy degradation material can exceed 96%, and the reinforment material can be recovered in good form provided that is sufficiently stable to the acidic recycling conditions.

4. The recycling method of degradable epoxy resin composites are relatively mild reaction conditions, economical, and easy to control.

EXAMPLES

Set forth below are examples of the compounds of this invention and methods of making and using them. They are intended to be illustrative and not to be constructed as limiting the scope of this invention in any way.

Example 1

Synthesis of Curing Agent A

N-(2-hydroxyethyl)phthalimide (1000 g), paraformaldehyde (157 g), and p-toluene sulfonic acid (6.8 g) were placed in 1.5 L of toluene in a 5 L round bottom flask equipped with Dean Stark apparatus. After 20 hours at reflux, the reaction was cooled to ambient temperature. Then 2 L of petroleum ether (bp: 60-90° C.) was added to the reaction mixture. The white precipitate was collected by filtration and washed with 1 L of petroleum ether and dried to yield 950 g of crude protected diamine. The crude diamine was deprotected by treatment with 3.4 L of 20% aqueous NaOH at reflux. After 10 h at reflux, the reaction mixture was cooled to ambient temperature, extracted with chloroform/isopropanol (3:1). The organic phase dried with anhydrous Na2SO4, and then distilled under vacuum to yield 200 g of curing agent A (Bp=71-72° C. @ 70 Pa): 1H NMR (CDCl3, 400 MHz): 4.74 (s, 2H), 3.59 (t, J=5.2 Hz, 4H), 2.89 (t, J=5.2 Hz, 4H).

Example 2

Synthesis of Curing Agent B

N-(2-hydroxyethyl)phthalimide (1000 g), 2,2-dimethoxy-propane (280 g), and p-toluene sulfonic acid (8 g) were placed in 1.5 L of toluene in a round bottom flask equipped with Dean Stark apparatus. After 20 hours, the reaction was cooled to ambient temperature and then 2 L of petroleum ether (bp: 60-90° C.) was added to the reaction mixture. The white precipitate was collected by filtration and washed with 1 L of petroleum ether and dried to yield 900 g of crude protected diamine. The crude diamine was deprotected by treatment with 80% hydrazine hydrate (460 g) in ethanol (600 mL) at reflux. After 10 h at reflux, the reaction mixture was cooled to ambient temperature and the precipitate was filtered from the solution and washed with ethanol and dichloromethane, respectively. The organic phases were combined, dried with anhydrous Na2SO4, and then distilled under vacuum to afford 200 g of curing agent B (Bp=61-64° C. @ 80 Pa): 1H NMR (CDCl3, 400 MHz): 3.47 (t, J=5.2 Hz, 4H), 2.85 (t, J=5.2 Hz, 4H), 1.38 (s, 6H).

Example 3

Preparation of a Reworkable Epoxy Composition and Fabrication of a Carbon Fiber Composite A reworkable epoxy composition was prepared by blending curing agent A (20 g) and a bisphenol A epoxy resin 828 (112 g, epoxy equivalent weight=185-192) at room temperature. This composition was used to fabricate a carbon fiber reinforced degradable epoxy composite using a wet lay-up method. Three pieces of woven carbon fiber fabric (3K) were used. After a final stage cure (2 h at 80° C., then 1 h at 125° C.), a carbon fiber composite obtained.

Example 4

Preparation of a Reworkable Epoxy Composition and Fabrication of a Carbon Fiber Composite A reworkable epoxy composition was prepared by blending curing agent B (20 g) and a bisphenol A epoxy resin 828 (93 g, epoxy equivalent weight=185-192) at room temperature. This composition was used to fabricate a carbon fiber reinforced degradable epoxy composite using a wet lay-up method. Three pieces of woven carbon fiber fabric (3K) were used. After a final stage cure (2 h at 80° C., then 1 h at 125° C.), a carbon fiber composite was obtained.

Example 5

Recycling of a Degradable Epoxy Composite

A portion (0.42 g) of the carbon fiber composite prepared in Example 3 was added to a stirring, hot (150-155° C.) solution of concentrated hydrochloric acid (10 mL) and ethylene glycol (55 mL). After 4 hours, the carbon fiber was recovered via hot filtration. The epoxy resin degradation products were recovered by precipitation and filtration after the neutralization of the filtrate solution with 20% aqueous NaOH. The mass recovery of the combined fiber and epoxy degradation product was above 96%. The surface of the recycled carbon fiber appeared clean with no defects.

Example 6

Recycling of a Degradable Epoxy Composite

A portion (0.5 g) of the carbon fiber composite prepared in Example 4 was added to a stirring, hot (150-155° C.) solution of concentrated hydrochloric acid (10 mL) and ethylene glycol (90 mL). After 4 hours, the carbon fiber was recovered via hot filtration. The epoxy resin degradation products were recovered by precipitation and filtration after the neutralization of the filtrate solution with 20% aqueous NaOH. The mass recovery of the combined fiber and epoxy degradation product was above 96%. The surface of the recycled carbon fiber appeared clean with no defects.

Example 7

Recycling of a Degradable Epoxy Composite

A portion (0.27 g) of the carbon fiber composite prepared in Example 3 was added to a stirring, hot (120° C.) solution of concentrated hydrochloric acid (10 mL) and butyl alcohol (90 mL). After 4 hours, the carbon fiber was recovered via hot filtration. The epoxy resin degradation products were recovered by precipitation and filtration after the neutralization of the filtrate solution with 20% aqueous NaOH. The mass recovery of the combined fiber and epoxy degradation product was above 96%. The surface of the recycled carbon fiber appeared clean with no defects.

Example 8

Recycling of a Degradable Epoxy Composite

A portion (0.64 g) of the carbon fiber composite prepared in Example 3 was added to a stirring, hot (120° C.) solution of concentrated hydrochloric acid (10 mL) and ethylene glycol (90 mL). After 4 hours, the carbon fiber was recovered via hot filtration. The epoxy resin degradation products were recovered by precipitation and filtration after the neutralization of the filtrate solution with 20% aqueous NaOH. The mass recovery of the combined fiber and epoxy degradation product was above 96%. The surface of the recycled carbon fiber appeared clean with no defects.

Example 9

Recycling of a Degradable Epoxy Composite

A portion (0.54 g) of the carbon fiber composite prepared in Example 4 was added to a stirring, hot (80° C.) solution of acetic acid (20 mL), ethanol (40 mL) and water (40 mL). After 4 hours, the carbon fiber was recovered via hot filtration. The epoxy resin degradation products were recovered by precipitation and filtration after the neutralization of the filtrate solution with 20% aqueous NaOH. The mass recovery of the combined fiber and epoxy degradation product was above 98%. The surface of the recycled carbon fiber appeared clean with no defects.

Example 10

Recycling of a Degradable Epoxy Composite

A portion (0.44 g) of the carbon fiber composite prepared in Example 4 was added to a stirring, hot (80° C.) solution of acetic acid (20 mL), ethylene glycol (40 mL) and water (40 mL). After 4 hours, the carbon fiber was recovered via hot filtration. The epoxy resin degradation products were recovered by precipitation and filtration after the neutralization of the filtrate solution with 20% aqueous NaOH. The mass recovery of the combined fiber and epoxy degradation product was above 98%. The surface of the recycled carbon fiber appeared clean with no defects.

Example 11

Recycling of a Degradable Epoxy Composite

A portion (0.3 g) of the carbon fiber composite prepared in Example 4 was added to a stirring, hot (80° C.) solution of acetic acid (10 mL), ethanol (50 mL) and water (40 mL). After 4 hours, the carbon fiber was recovered via hot filtration. The epoxy resin degradation products were recovered by precipitation and filtration after the neutralization of the filtrate solution with 20% aqueous NaOH. The mass recovery of the combined fiber and epoxy degradation product was above 98%. The surface of the recycled carbon fiber appeared clean with no defects.

Example 12

Preparation and Demonstration of Recycling of Mobile Phone Case

Figure 1:
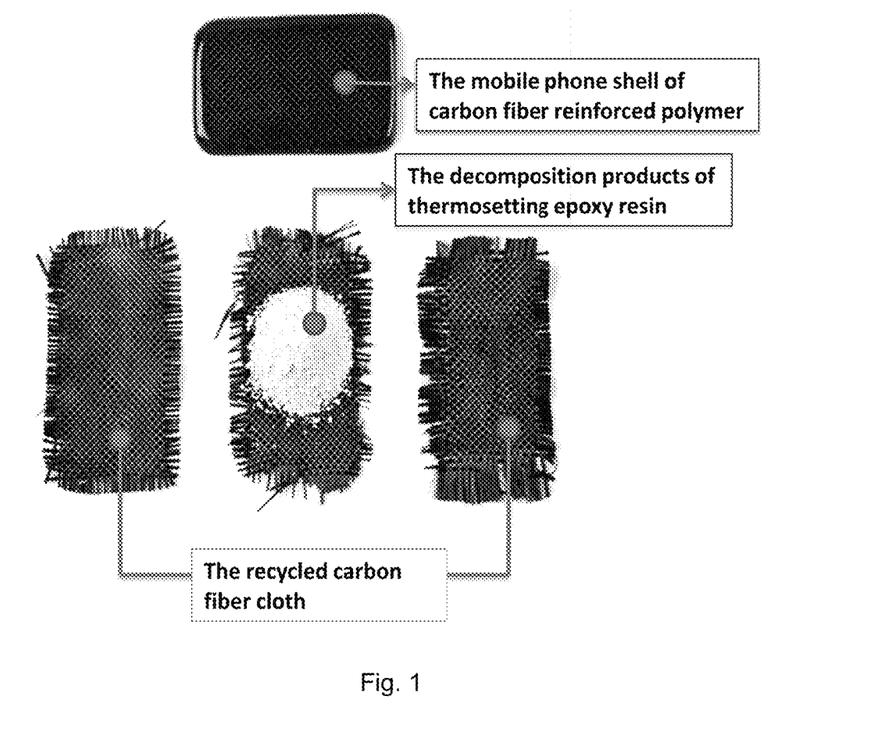
FIG. 1 shows the recovered epoxy polymer and recovered carbon fiber after recycling of the degradable composite as described in example 12.

A prototype carbon fiber mobile phone case was prepared from a reworkable epoxy composition as prepared in example 4, using three pieces of woven carbon fiber fabric (3K) via wet lay-up techniques using a mobile phone casing mold. The phone case was released from the mold after a final stage cure (2 hrs at 80° C., then 1 h at 125° C.). The mobile phone case had a weight of 12.9 g. The composite case was recycled by immersion in a recycling solution of acetic acid/ethanol/water (50 mL/250 mL/200 mL) at 80° C. After 5 hours, the carbon fiber was recovered by hot filtration. The polymeric epoxy degradation products were recovered via precipitation and filtration after the neutralization of the filtrate solution with 20% aqueous NaOH. 7.87 g of carbon fiber was recovered from the recycling. The surface of the carbon fiber appeared clean with no apparent defects. 4.82 g of epoxy degradation byproduct was obtained as a white solid. The mass recovery of the combined fiber and epoxy degradation product was above 98%. The recovered epoxy degradation product was analyzed with GPC using polyethylene oxide standards to give the following data: Mn=125KDa; MW=193KDa; PDI=1.53. The 1H NMR of the epoxy degredation byproduct was similar to the 1H NMR obtained from the polymerization product of ethanolamine and bisphenol A digycidyl ether.

Example 13

Preparation and Demonstration of Recycling of Plate Case

Figure 2:
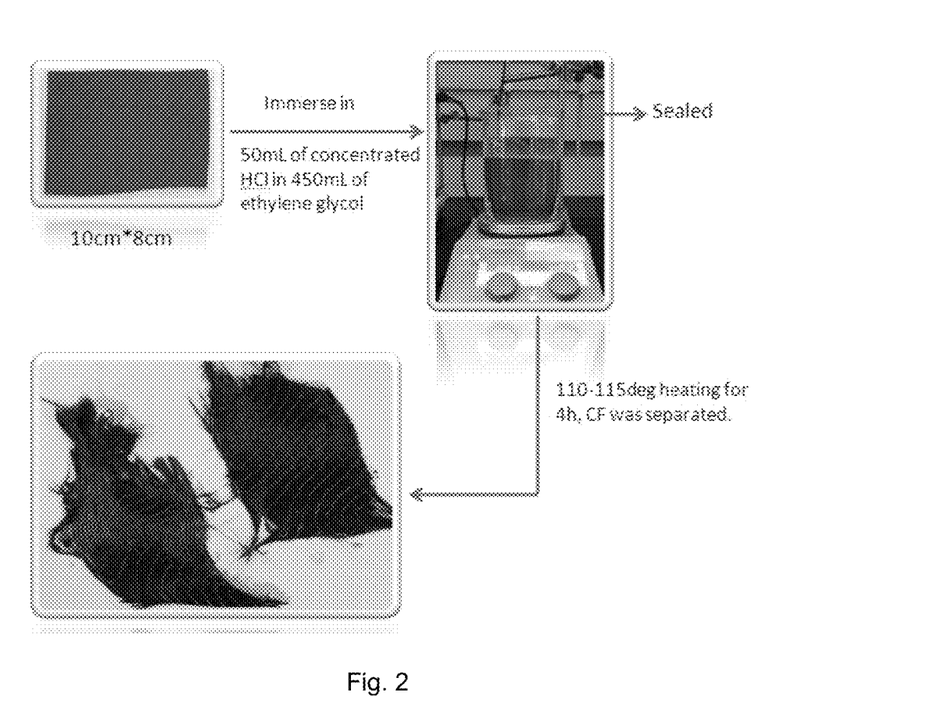
FIG. 2 shows the recovered carbon fiber after recycling of the degradable composite as described in example 13.

A prototype carbon fiber plate case was prepared from a reworkable epoxy composition as prepared in example 3, using two pieces of woven carbon fiber fabric (3K) via vacuum infusion techniques using a plate mold. The plate was released from the mold after a final stage cure (2 h at 80° C., then 1 h at 125° C.). The plate case had a size of 10 cm*8 cm. The composite case was recycled by immersion in a recycling solution of concentrate hydrochloride acid/ethylene glycol (50 mL/450 mL) at 110-115° C. After 4 hours, the carbon fiber was recovered by hot filtration. The surface of the carbon fiber appeared clean with no apparent defects.

Example 14

Comparison of Non-Composite Properties

Figure 3:
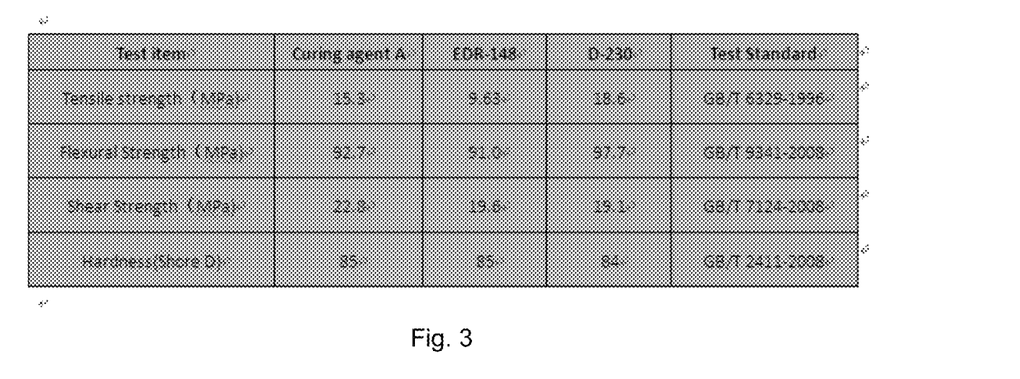
FIG. 3 shows the properties of non-composites as described in example 14.

Curing agent A was compared with other curing agent amines (Jeffamine® EDR-148 and D-230). A composition was prepared by blending curing agent and a bisphenol A epoxy resin 828 (epoxy equivalent weight=185-192) at room temperature, then cured (2 hrs at 80° C., then 1 h at 125° C.), and testing according to GB standards.

The examples described herein also serve to demonstrate the fact that molecular structure of the degradable curing agents can be used to ultimately tune the degradability characteristics of the reworkable epoxy compositions, and therefore, the degradation properties of their cured composite structures. For example, the composite in example 8 is derived from a reworkable epoxy composition that employs curing agent A, which contains formal linkages. This composite requires more strongly acidic conditions and higher temperature to readily degrade. On the other hand, as demonstrated by example 9, a composite fabricated from a reworkable epoxy composition that employs curing agent B is readily degradable by employment of more weakly acidic conditions and at lower temperature. Curing agent B contains ketal linkages, which are more readily hydrolyzed in acidic conditions relative to the formal linkages.

The invention has been described above with the reference to specific examples and embodiments, not to be constructed as limiting the scope of this invention in any way. It is understood that various modifications and additions can be made to the specific examples and embodiments disclosed without departing from the spirit of the invention, and all such modifications and additions are contemplated as being part of the present invention.

What is claimed is:

1. A method for recycling a recyclable reinforced composite comprising a reinforcement material in a degradable cross-linked polymer matrix, wherein the degradable cross-linked polymer comprises a cross-linking group derived from a curing agent represented by formula I:

wherein $R^1$ is hydrogen, alkyl, cycloalkyl, heterocycloalkyl, alkenyl, cycloalkenyl, aryl, heteroaryl, alkoxy alkyl, or alkynyl; A is alkenene, alkylene-hetero-alkylene, alkylene-heterocyclo-alkylene, alkylene, alkylene-oxy-alkylene, 1,4-alkyl substituted piperazine, carbonyl, or thiocarbonyl; B is alkenene, alkylene-hetero-alkylene, alkylene-heterocyclo-alkylene, alkylene, alkylene-oxy-alkylene, 1,4-alkyl substituted piperazine, carbonyl, or thiocarbonyl; $R^2$ is hydrogen, alkyl, aminoalkyl, alkyl-amino-alkyl, cycloalkyl, heterocycloalkyl, alkenyl, aryl, or heteroaryl; and $R^3$ is hydrogen, alkyl, aminoalkyl, alkyl-amino-alkyl, cycloalkyl, heterocycloalkyl, alkenyl, aryl, or heteroaryl, wherein the method comprises a step of degrading the cross-linked polymer matrix using an acid and a solvent.

2. The method of claim 1, wherein the degrading is performed under a heating condition.

3. The method of claim 1, wherein the acid is at least one selected from the group consisting of hydrochloric acid, acetic acid, lactic acid, formic acid, propionic acid, citric acid, methane sulfonic acid, p-toluene sulfonic acid, nitric acid, sulfuric acid, benzoic acid, and phthalic acid.

4. The method of claim 1, wherein the solvent is at least one selected from the group consisting of methanol, ethanol, ethylene glycol, isopropyl alcohol, butyl alcohol, pentanol, hexanol, heptanol, octanol alcohol, nonyl alcohol, and water.

5. The method of claim 1, wherein the acid has a concentration in a range of 2-90% by weight.

6. The method of claim 2, wherein the heating temperature is 15-400° C.

7. The method of claim 1, further comprising a step of recovering the degradation product via a filtration process and/or a precipitation process.

8. The method of claim 1, wherein the cross-linked polymer is cross-linked epoxy resin.

9. The method of claim 8, wherein the epoxy resin is at least one selected from the group consisting of glycidyl ether epoxy resin, glycidyl ester epoxy resin, glycidyl amine epoxy resin, alicyclic epoxy resin, aliphatic epoxy resin, and phenolic epoxy resin.

10. The method of claim 1, wherein the degradable cross-linked polymer matrix is derived from a degradable curing agent, an epoxy resin and an optional auxiliary material, and the curing agent is represented by the following formula I:

wherein $R^1$ is hydrogen, alkyl, cycloalkyl, heterocycloalkyl, alkenyl, cycloalkenyl, aryl, heteroaryl, alkoxy alkyl, or alkynyl; A is alkenene, alkylene-hetero-alkylene, alkylene-heterocyclo-alkylene, alkylene, alkylene-oxy-alkylene, 1,4-alkyl substituted piperazine, carbonyl, or thiocarbonyl; B is alkenene, alkylene-hetero-alkylene, alkylene-heterocyclo-alkylene, alkylene, alkylene-oxy-alkylene, 1,4-alkyl substituted piperazine, carbonyl, or thiocarbonyl; $R^2$ is hydrogen, alkyl, aminoalkyl, alkyl-amino-alkyl, cycloalkyl, heterocycloalkyl, alkenyl, aryl, or heteroaryl; and $R^3$ is hydrogen, alkyl, aminoalkyl, alkyl-amino-alkyl, cycloalkyl, heterocycloalkyl, alkenyl, aryl, or heteroaryl.

11. The method of claim 10, wherein the auxiliary material is at least one selected from the group consisting of accelerator, diluents, toughening agent, thickening agent, adhesion promoter, optical brightener, pigment, adducting component, coupling agent, filler, decorative component, thixotropic agent, fluorophore, UV-absorber, anti-oxidant, and gloss additive.

12. The method of claim 1, wherein the cross-linked polymer is a cross-linked epoxy resin.

13. The method of claim 12, wherein the epoxy resin is at least one selected from a the group consisting of glycidyl ether epoxy resin, glycidyl ester epoxy resin, glycidyl amine epoxy resin, alicyclic epoxy resin, aliphatic epoxy resin, and phenolic epoxy resin.

14. The method of claim 1, wherein the reinforcement material is a fibrous material or a non-fibrous material.

15. The method of claim 14, wherein the fibrous material is at least one selected from the group consisting of glass fiber, carbon fiber, and natural fiber; and the non-fibrous material is at least one selected from the group consisting of carbon nanotube, carbon black, metal nanoparticle, organic nanoparticle, iron oxide, and boron nitride.

16. The method of claim 1, wherein the reinforced composite is prepared by at least one method selected from the group consisting of wet lay-up, vacuum infusion, filament winding, and resin transfer molding.

* * * * *